(12) United States Patent
Baba et al.

(10) Patent No.: US 10,814,826 B2
(45) Date of Patent: Oct. 27, 2020

(54) AIRBAG DEVICE

(71) Applicant: AUTOLIV DEVELOPMENT AB, Vargarda (SE)

(72) Inventors: Yutaka Baba, Kanagawa (JP); Kazuki Morita, Kanagawa (JP); Hiroyoshi Shimono, Kanagawa (JP)

(73) Assignee: AUTOLIV DEVELOPMENT AB, Vargarda (SE)

( * ) Notice: Subject to any disclaimer, the term of this patent is extended or adjusted under 35 U.S.C. 154(b) by 8 days.

(21) Appl. No.: 16/307,614

(22) PCT Filed: May 4, 2017

(86) PCT No.: PCT/JP2017/017321
§ 371 (c)(1),
(2) Date: Dec. 6, 2018

(87) PCT Pub. No.: WO2017/212839
PCT Pub. Date: Dec. 14, 2017

(65) Prior Publication Data
US 2019/0308583 A1    Oct. 10, 2019

(30) Foreign Application Priority Data
Jun. 7, 2016  (JP) .................................. 2016-113948

(51) Int. Cl.
*B60R 21/239*   (2006.01)
*B60R 21/203*   (2006.01)
(Continued)

(52) U.S. Cl.
CPC .......... *B60R 21/239* (2013.01); *B60R 21/203* (2013.01); *B60R 21/205* (2013.01);
(Continued)

(58) Field of Classification Search
CPC . B60R 21/239; B60R 21/205; B60R 21/2338; B60R 21/203; B60R 2021/2395; B60R 2021/23382
See application file for complete search history.

(56) References Cited

U.S. PATENT DOCUMENTS

| 7,878,538 B2 | 2/2011 | Abe et al. |
| 8,070,183 B2 | 12/2011 | Kumagai et al. |

(Continued)

FOREIGN PATENT DOCUMENTS

| CN | 101428601 A | 5/2009 |
| CN | 105365743 A | 3/2016 |

(Continued)

OTHER PUBLICATIONS

International Search Report of PCT/JP2017/017321 dated Aug. 1, 2017.

*Primary Examiner* — Darlene P Condra
(74) *Attorney, Agent, or Firm* — Dickinson Wright PLLC

(57) ABSTRACT

An airbag includes first and second inner tethers, first and second vent holes formed on left and right sides of the airbag, and first and second opening/closing members capable of opening/closing the first and second vent holes. A first opening/closing tether has a first end portion coupled to the first opening/closing member and a second end portion coupled to the first inner tether, and a second opening/closing tether has a first end portion coupled to the second opening/closing member and a second end portion coupled to the second inner tether. When an occupant contacts the airbag, at least one of the first and second inner tethers is deformed to move at least one of the first and second opening/closing tethers toward the corresponding vent hole and cause at least one of the first and second opening/closing members to open the corresponding vent hole.

18 Claims, 8 Drawing Sheets

(51) Int. Cl.
  *B60R 21/2338* (2011.01)
  *B60R 21/205* (2011.01)

(52) U.S. Cl.
  CPC .. *B60R 21/2338* (2013.01); *B60R 2021/2395* (2013.01); *B60R 2021/23382* (2013.01)

(56) References Cited

U.S. PATENT DOCUMENTS

| | | | |
|---|---|---|---|
| 8,434,786 B2 | 5/2013 | Jang et al. | |
| 9,333,939 B2 | 5/2016 | Koshikawa et al. | |
| 9,403,504 B2 | 8/2016 | Umehara et al. | |
| 9,428,141 B2 | 8/2016 | Kwon | |
| 2002/0056978 A1* | 5/2002 | Keshavaraj | B60R 21/2338 280/743.2 |
| 2003/0189327 A1* | 10/2003 | Burdock | B60R 21/231 280/743.2 |
| 2010/0032931 A1* | 2/2010 | Kumagai | B60R 21/2338 280/742 |
| 2010/0133798 A1* | 6/2010 | Fukawatase | B60R 21/2338 280/743.2 |
| 2011/0133437 A1* | 6/2011 | Jang | B60R 21/2338 280/743.2 |
| 2012/0074677 A1* | 3/2012 | Hiruta | B60R 21/2338 280/739 |
| 2015/0274115 A1* | 10/2015 | Fischer | B60R 21/239 280/743.2 |
| 2015/0283972 A1* | 10/2015 | Fischer | B60R 21/276 280/740 |
| 2015/0375707 A1* | 12/2015 | Saito | B60R 21/239 280/728.3 |
| 2017/0072897 A1* | 3/2017 | Kruse | B60R 21/239 |
| 2017/0088087 A1* | 3/2017 | Williams | B60R 21/2338 |
| 2019/0329728 A1* | 10/2019 | Malapati | B60R 21/203 |
| 2020/0031304 A1* | 1/2020 | Malapati | B60R 21/2338 |

FOREIGN PATENT DOCUMENTS

| | | |
|---|---|---|
| DE | 10 2015 110 365 A1 | 12/2015 |
| EP | 2 058 182 A1 | 5/2009 |
| EP | 2 156 995 A1 | 2/2010 |
| EP | 2 832 592 A1 | 4/2015 |
| JP | 2009-035055 A | 2/2009 |
| JP | 2009-113757 A | 5/2009 |
| JP | 2010-036770 A | 2/2010 |
| JP | 2010-173620 A | 8/2010 |
| JP | 2013-203166 A | 10/2013 |
| JP | 2016-013712 A | 1/2016 |
| KR | 10-2011-0064942 A | 6/2011 |
| KR | 10-2016-0020880 A | 2/2016 |
| WO | WO 2009/016871 A1 | 2/2009 |
| WO | WO 2013/146493 A1 | 10/2013 |

\* cited by examiner (A) LEFT SIDE SURFACE (IN PERSPECTIVE)

(B) TOP SURFACE (IN PERSPECTIVE)

(A)
TOP SURFACE
(OUTER SURFACE)

(B)
BACK SURFACE
(INNER SURFACE)

(A) VENT IS CLOSED (B) VENT IS OPEN (A) LEFT SIDE SURFACE (IN PERSPECTIVE)

(B) TOP SURFACE (IN PERSPECTIVE)

TOP SURFACE (IN PERSPECTIVE)

TOP SURFACE

AIRBAG DEVICE

CROSS-REFERENCE TO RELATED APPLICATIONS

This application is a 35 U.S.C. § 371 national phase of PCT International Application No. PCT/JP2017/017321, filed May 4, 2017, which claims the benefit of priority under 35 U.S.C. § 119 to Japanese Patent Application No. 2016-113948, filed Jun. 7, 2016, the contents of which are incorporated herein by reference in their entirety.

FIELD OF THE INVENTION

The present invention relates to a vehicular airbag device, and particularly relates to an airbag device which is deployed in front of an occupant to restrain the occupant.

BACKGROUND

It is well known to provide one or a plurality of airbags in a vehicle to protect an occupant in the event of a vehicle accident. Airbags come in various forms such as, for example, a so-called driver airbag which starts to inflate around the center of an automobile steering wheel to protect a driver, a curtain airbag which is deployed downward on the inside of an automobile side window to protect an occupant in the event of a vehicle side impact or a tip-over or rollover accident, and a side airbag which is deployed between an occupant and a side panel to protect the occupant in the event of a vehicle side impact.

In a driver seat airbag device or a passenger seat airbag device contained in an instrument panel (dashboard), rapid deployment of an airbag is important. On the other hand, after completely deployed, the airbag is required to attenuate or absorb the impact on an occupant by exhausting gas to the outside and reducing the inner pressure thereof.

As a method for reducing the inner pressure of the airbag, it is typical to provide vent holes. However, when vent holes are simply provided, a gas loss occurs and thus, to ensure rapid deployment, it is necessary to take measures by, for example, increasing the capacity of an inflator.

The present invention has been achieved in view of circumstances as described above, and an object of the present invention is to provide an airbag device which contributes to attenuating an impact on an occupant, while minimizing a loss in inflation gas.

Another object of the present invention is to provide a structure which allows an exhausting operation to be performed even when an occupant moves into a deployed airbag in a diagonal direction or in off-center (offset or oblique) relation.

SUMMARY AND INTRODUCTORY DESCRIPTION OF THE INVENTION

To attain the above objects, embodiments of the present invention include an airbag that is inflated and deployed in front of an occupant to be protected and an inflator that generates a gas which inflates the airbag. The airbag includes: first and second inner tethers each having a front panel coupled to a stationary portion around the inflator and a rear panel coupled to an occupant side of the airbag to control a shape into which the airbag is deployed; first and second vent holes formed on left and right sides of the airbag when viewed from the occupant; first and second opening/closing members capable of opening/closing the first and second vent holes; a first opening/closing tether having an opening/closing end portion coupled to the first opening/closing member and a coupled end portion coupled between the front panel and the rear panel of the first inner tether; and a second opening/closing tether having an opening/closing end portion coupled to the second opening/closing member and a coupled end portion coupled between the front panel and the rear panel of the second inner tether. The airbag is configured such that, when the airbag is in a fully deployed state, under tension of the first and second opening/closing tethers, the first and second vent holes are closed by the first and second opening/closing members and, when the occupant moves into the airbag, at least one of the first and second inner tethers is deformed (warped or bent) to move at least one of the first and second opening/closing tethers toward the corresponding vent hole and cause at least one of the first and second opening/closing members to open the corresponding vent hole.

Such a configuration as described above eliminates the need to adopt vent holes in a normally open state, eliminates a loss in inflation gas, and can minimize the required gas volume capacity of the inflator. In addition, since the first and second opening/closing tethers are coupled respectively to the two independent first and second inner tethers, even when an occupant moves into the deployed airbag out of position (in offset relation), at least one of the vent holes is opened. At this time, the vent hole closer to the occupant is opened to ensure the function of reducing an impact on the occupant.

Note that the front panel and the rear panel respectively included in the first and second inner tethers can be formed using a fabric, a resin, or the like having an intended rigidity.

Respective positions where the first and second opening/closing tethers and the first and second inner tethers are coupled together can be located in the vicinities of longitudinal centers of the inner tethers. This allows the opening/closing tethers and the opening/closing members to promptly open the vent holes. Of the inner tethers placed under tension by the deployment of the airbag, portions in the vicinities of the longitudinal centers thereof are likely to be deformed (warped or bent) first as a result of the movement of an occupant into the airbag and, in association therewith, the opening/closing tethers also promptly move toward the vent holes. This allows the vent holes to be promptly opened.

The first and second inner tethers can be disposed above a vertical center position of the airbag in a deployed state. The airbag device is also allowed to have a structure in which, in the state where the airbag is fully deployed, the first and second opening/closing tethers extend obliquely upward at predetermined angles from the first and second inner tethers. By inclining directions in which the opening/closing tethers extend at predetermined angles, it is possible to finely adjust timings for opening the vent holes. In addition, by increasing the distance between the first and second vent holes, at least one of the first and second vent holes is opened earlier when an occupant moves into the airbag in offset relation.

The airbag can further include a third inner tether. For example, by equidistantly disposing the plurality of (three or more) inner tethers extending toward a direction in which the airbag is deployed, even when the position where the occupant moves into the deployed airbag is displaced from the first and second inner tethers, the warping of the other (third) inner tethers is transmitted to the first and second inner tethers to allow the first and second inner tethers directly associated with the opening/closing of the vent holes to be operated.

The airbag device according to the present invention may be provided as a driver seat airbag device contained in a steering wheel. Since the distance between the airbag and the occupant (driver) is relatively small, the function of the vent holes is particularly important. Note that the airbag device according to the present invention is also applicable to a passenger seat airbag device contained in a vehicle instrument panel.

In the present application, "upper" and "lower" show an upper side and a lower side in a vertical direction, "front" and "rear" show a front side and a rear side in a vehicle traveling direction, and "left" and "right" show a left side and a right side in a vehicle width direction in the state where the vehicle faces forward in the vehicle traveling direction.

BRIEF DESCRIPTION OF DRAWINGS

FIGS. 1(A) and 1(B) are perspective views each showing an inner structure of an airbag in a fully deployed state in an airbag device according to the present invention, of which FIG. 1(A) shows the fully deployed airbag viewed from the left side surface thereof and FIG. 1(B) shows the fully deployed airbag viewed from the top surface thereof.

FIGS. 2(A) and 2(B) are plan views each showing a structure of a patch plug (vent hole opening/closing mechanism) used in the airbag device according to the present invention, of which FIG. 2(A) shows the patch plug viewed from the outer surface of the airbag and FIG. 2(B) shows the patch plug viewed from inside the airbag.

FIGS. 3(A) and 3(B) are cross-sectional views each showing the structure of the patch plug (vent hole opening/closing mechanism) used in the airbag device according to the present invention, of which FIG. 3(A) shows a state where the vent hole is closed and FIG. 3(B) shows a state where the vent hole is open.

FIGS. 4(A) and 4(B) are perspective views each showing a state where, in the airbag device according to the present invention, an occupant has moved into the deployed airbag substantially from the front, of which FIG. 4(A) shows the state viewed from the left side surface thereof and FIG. 4(B) shows the state viewed from the top surface thereof.

DETAILED DESCRIPTION OF THE INVENTION

The following will describe an example in which the present invention is applied to a driver seat airbag device.

Figure 1:
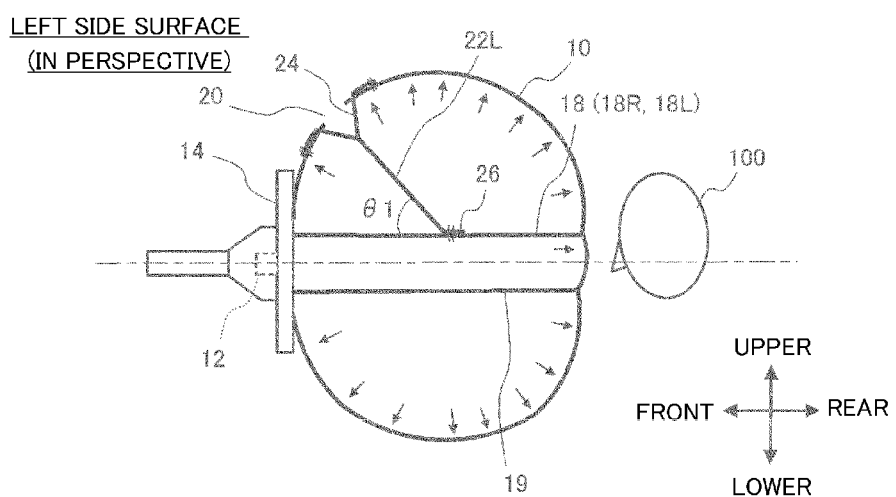
Figure 1:
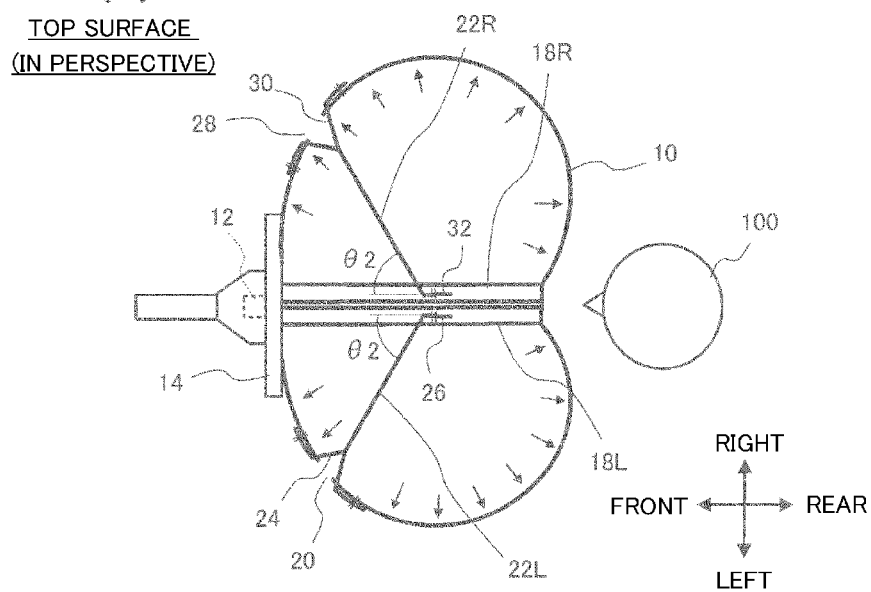

FIGS. 1(A) and 1(B) are perspective views showing an inner structure of an airbag in a fully deployed state in an airbag device according to the present invention, of which FIG. 1(A) shows the fully deployed airbag viewed from the left side surface thereof and FIG. 1(B) shows the fully deployed airbag viewed from the top surface thereof.

The airbag according to the present invention includes an airbag 10 that is inflated and deployed in front of an occupant 100 to be protected and an inflator 12 that generates gas which inflates the airbag 10. The inflator 12 is contained in a steering wheel 14 and configured to generate the inflation gas in a required amount.

Figure 8:
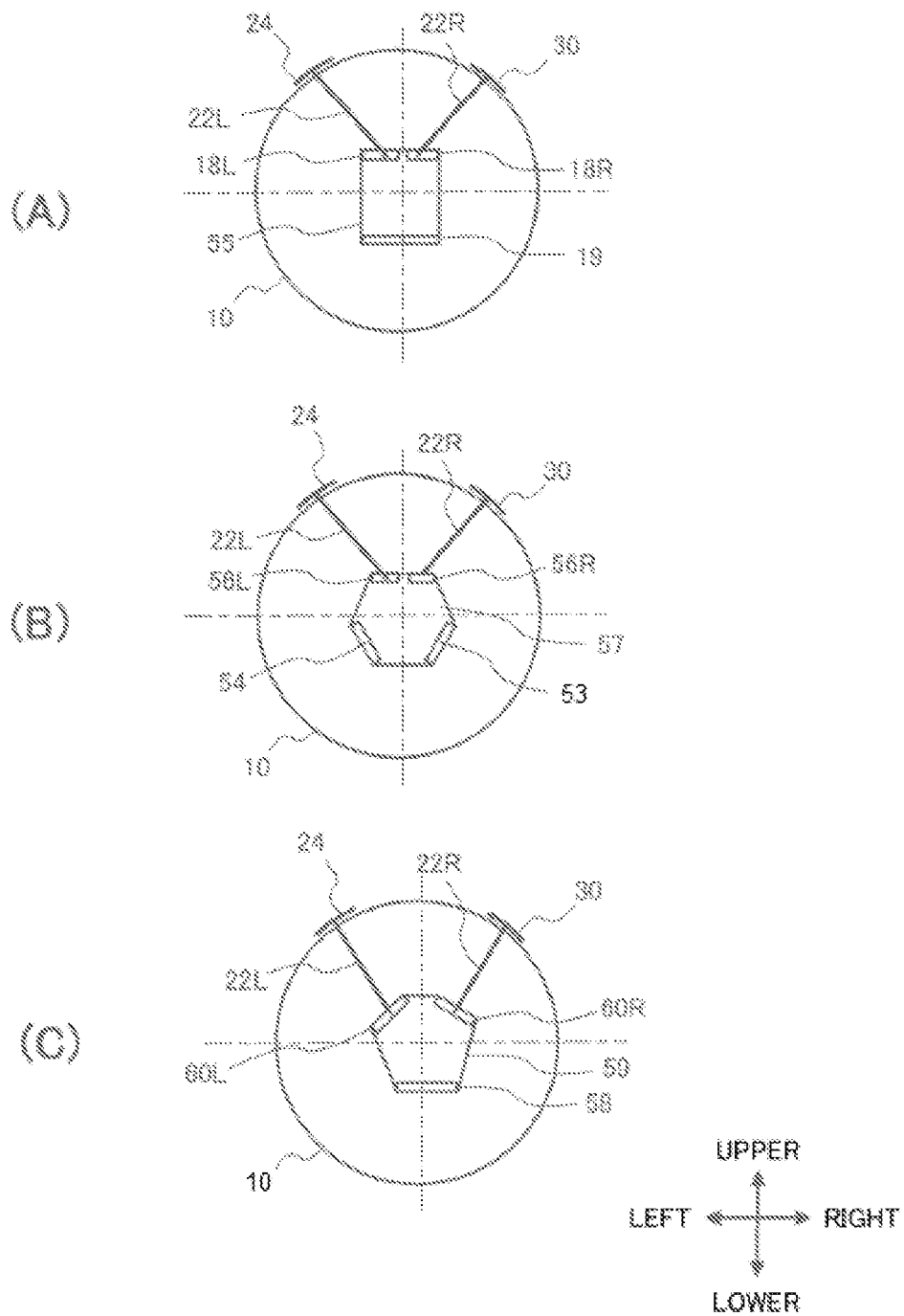
FIGS. 8(A), 8(B), and 8(C) are views showing still other examples of the structure of the inner tethers used in the airbag device according to the present invention, which schematically show states viewed from an occupant in see-through relation and in which a back side and a front side in a direction perpendicular to the paper surface with the drawings correspond to "FRONT" and "REAR", respectively.

The airbag 10 includes first and second inner tethers 18R and 18L and a third inner tether 19 (see FIG. 8(A)) disposed under the first and second inner tethers 18R and 18L. Each of the inner tethers 18R, 18L, and 19 has a front panel coupled to a stationary portion around the inflator 12 and a rear panel coupled to the occupant 100 side of the airbag 10. Using these inner tethers 18R, 18L, and 19, the shape into which the airbag 10 is deployed, especially the protrusion thereof toward the occupant 100 is appropriately controlled. Note that the inner tethers 18R, 18L, and 19 can be formed of the same material as that of the main body of the airbag. Each of the inner tethers 18R, 18L, and 19 is formed in an oblong strip shape, but the shape, width, material (flexibility) thereof can be changed appropriately in accordance with a condition such as the type of a vehicle in which the airbag device is mounted.

In addition, the airbag 10 includes first and second vent holes 20 and 28 formed at laterally symmetrical positions in the upper left and right portions of the airbag 10 when viewed from the occupant 100. The airbag 10 also includes an opening/closing mechanism (24, 30, 22L, and 22R) that opens/closes the vent holes 20 and 28.

As will be described later in detail, in the present embodiment, a structure is adopted in which, in association with the deformation (warping or bending) of the inner tethers 18L and 18R, the opening/closing tethers 22L and 22R are moved toward the vent holes 20 and 28 to thus open the vent hole 20. Accordingly, the vent holes 20 and 28 are disposed/formed closer to (forward of) the steering wheel 14 than coupled end portions 26 and 32 of the opening/closing tethers 22L and 22R.

In FIG. 1(A), an angle θ1 between the opening/closing tether 22L and the inner tether 18L in a perpendicular plane parallel with a vehicle traveling direction, which affects the opening/closing property of the vent hole 20, needs to be optimally set. Likewise, in FIG. 1(B), an angle θ2 between the opening/closing tether 22L and the inner tether 18L in a horizontal plane parallel with the vehicle traveling direction also needs to be optimally set.

For example, if the angle θ1 and the angle θ2 are changed from obtuse angles (at which the coupled end portions 26 and 32 are located on the front side) to acute angles (at which the coupled end portions 26 and 32 are located on the rear side), when the occupant 100 moves into the airbag 10, the opening/closing tethers 22L and 22R are allowed to easily move toward the vent holes 20 and 28 and more reliability ensure open areas for the vent holes 20 and 28. Accordingly, each of the angle θ1 shown in FIG. 1(A) and the angle θ2 shown in FIG. 1(B) is preferably set smaller than 90 degrees.

Figure 2:
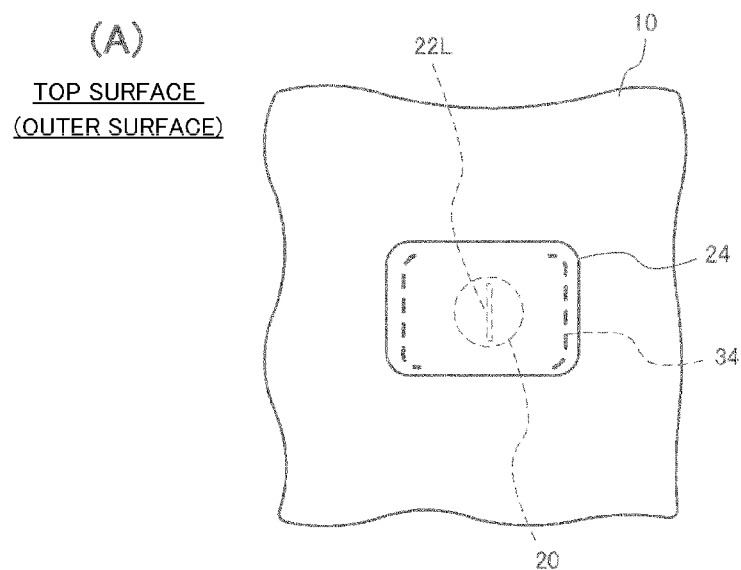
Figure 2:
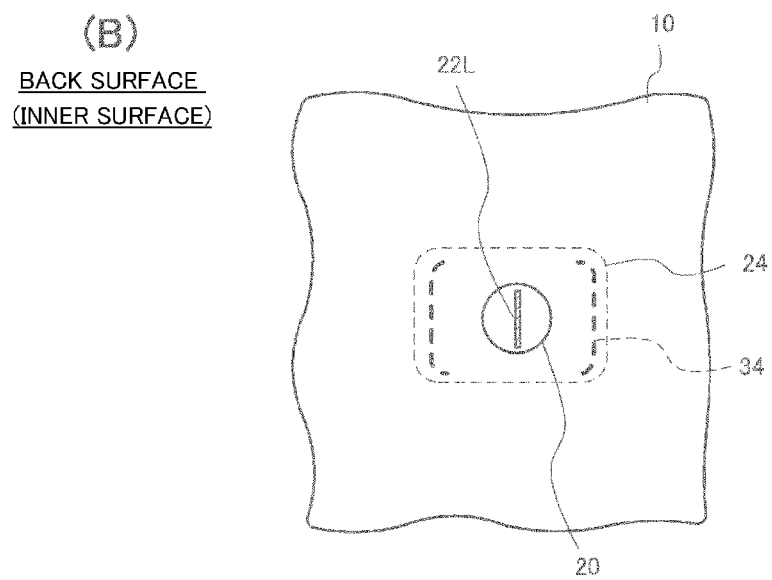

FIGS. 2(A) and 2(B) are plan views showing a structure of a patch plug (vent hole opening/closing mechanism) used in the airbag device according to the present invention, of which FIG. 2(A) shows the patch plug viewed from the outer surface of the airbag and FIG. 2(B) shows the patch plug viewed from inside the airbag.

Figure 3:
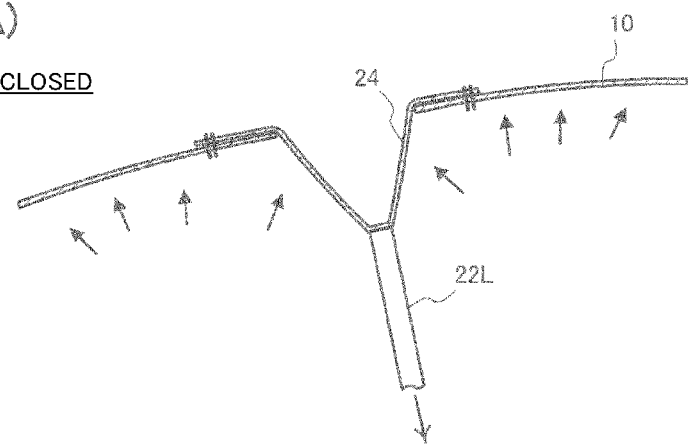
Figure 3:
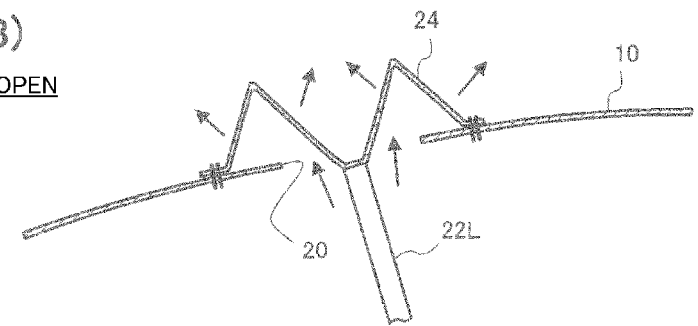

FIGS. 3(A) and 3(B) are cross-sectional views showing the structure of the patch plug (vent hole opening/closing mechanism), of which FIG. 3(A) shows a state where the vent hole is closed and FIG. 3(B) shows a state where the vent hole is open.

The vent hole opening/closing mechanism includes first and second opening/closing members 24 and 30 that open/close the first and second vent holes 20 and 28, the first opening/closing tether 22L having an opening/closing end portion coupled to the first opening/closing member 24 and the coupled end portion 26 coupled between the front panel and the rear panel of the first inner tether 18L, and the second opening/closing tether 22R having an opening/closing end portion coupled to the second opening/closing member 30 and the coupled end portion 32 coupled between the front panel and the rear panel of the second inner tether 18R.

Note that each of FIGS. 2(A)-3(B) show only one (left) vent hole opening/closing mechanism, but the other (right) vent hole opening/closing mechanism has the same structure. Accordingly, a description will be given of the left mechanism. The rectangular opening/closing member 24 is disposed so as to cover the circular vent hole 20 from the outside, and the opposed two edges thereof are fixed to the airbag 10 with sewing 34. In the vicinity of the center of a cloth edge 24, to the position corresponding to the vent hole 20, the opening/closing tether 22L is coupled.

When the airbag 10 is in a fully deployed state (FIGS. 1(A), 1(B) and 3(A)), the opening/closing tether 22L is pulled to the inside of the airbag 10 so that the vent hole 20 is closed by the cloth edge 24. On the other hand, when the occupant 100 moves into the deployed airbag 10, the corresponding inner tether 18L is deformed (warped or bent) so that the opening/closing tether 22L moves toward the vent hole 14 and inflation gas pushes the cloth edge 24 outward of the airbag 10 as shown in FIG. 3(B). As a result, the cloth edge 24 floats from the surface of the airbag 10 to open the vent hole 24 so that the gas is exhausted from the region of the cloth edge 24 without the sewing 34.

Figure 4:
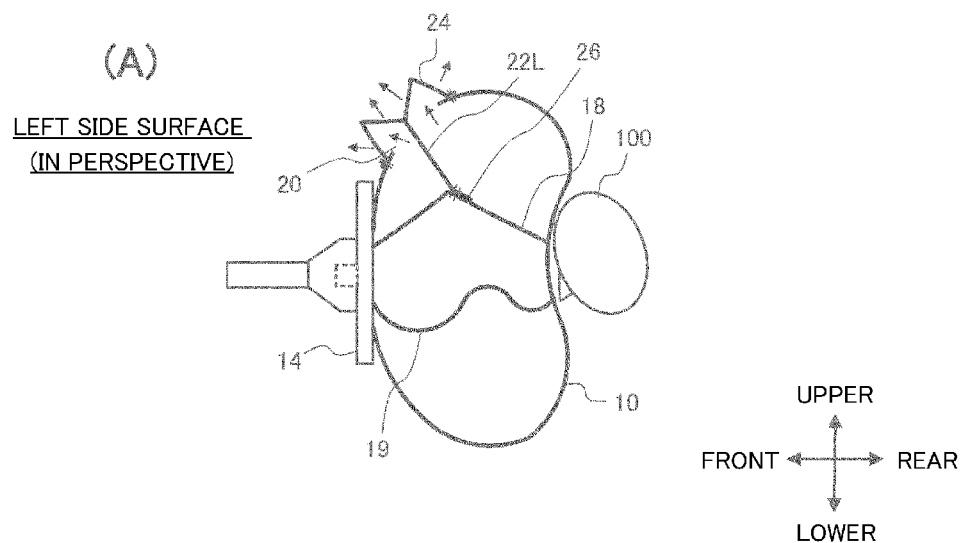
Figure 4:
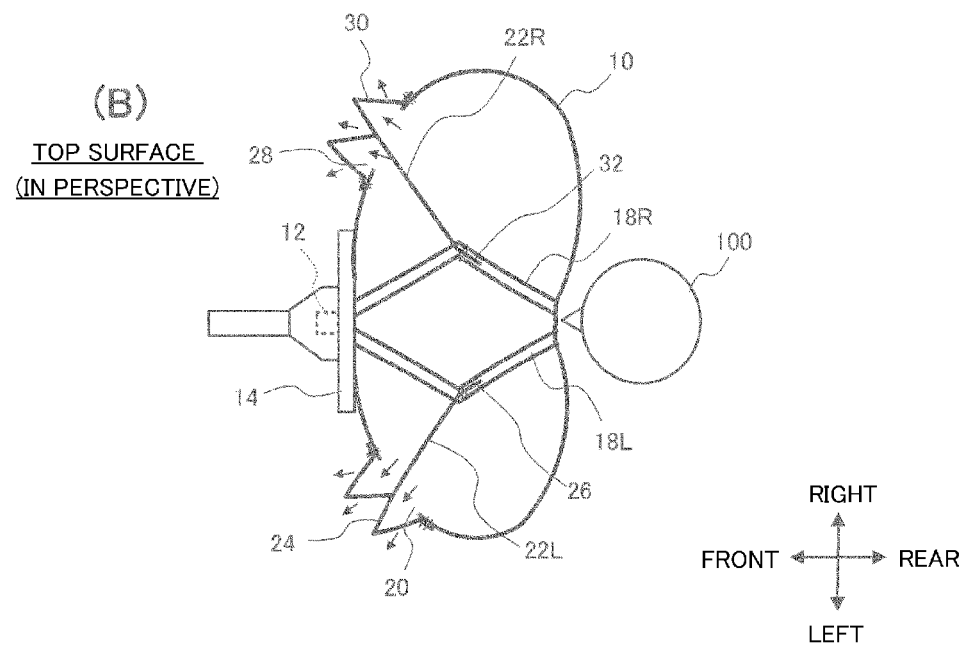

FIGS. 4(A) and 4(B) are perspective views showing a state where, in the airbag device according to the present invention, the occupant 100 has moved into the deployed airbag 10 substantially from the front, of which FIG. 4(A) shows the state viewed from the left side surface thereof and FIG. 4(B) shows the state viewed from the top surface thereof. The operations of opening/closing the vent holes 20 and 28 are as already described above. In the example in FIG. 4(B), the occupant 100 has moved into the airbag 10 from the front so that the left and right vent holes 20 and 28 are substantially simultaneously opened so that the gas is exhausted generally equally from the left and right vent holes 20 and 28.

Figure 5:
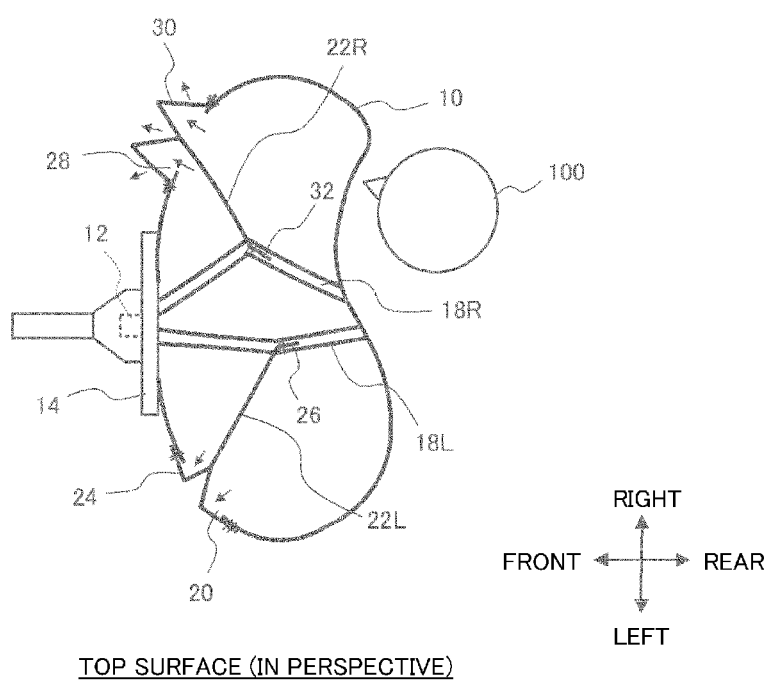
FIG. 5 is a top perspective view showing a state where, in the airbag device according to the present invention, an occupant has moved into the portion of the deployed airbag which is located offset rightward from the center.

FIG. 5 is a top perspective view showing a state where, in the airbag device according to the present invention, the occupant 100 has moved into a portion of the deployed airbag 10, the portion being located offset rightward from the center. In this example, the right inner tether 18R is significantly deformed (warped or bent) as the occupant 100 moves into the airbag 10, while the deformation (warping or bending) of the left inner tether 18L is relatively small. As a result, the right opening/closing tether 22R significantly moves toward the vent hole 28 to open the vent hole 28 earlier.

Thus, in the present invention, the first and second opening/closing tethers 22L and 22R are coupled individually to the two independent first and second inner tethers (18L and 18R). Accordingly, even when the occupant 100 moves out of position (offset) into the deployed airbag 10, at least one of the vent holes is opened. The vent hole opened at this time is closer to the occupant 100, which ensures the function of reducing an impact on the occupant 100.

Figure 6:
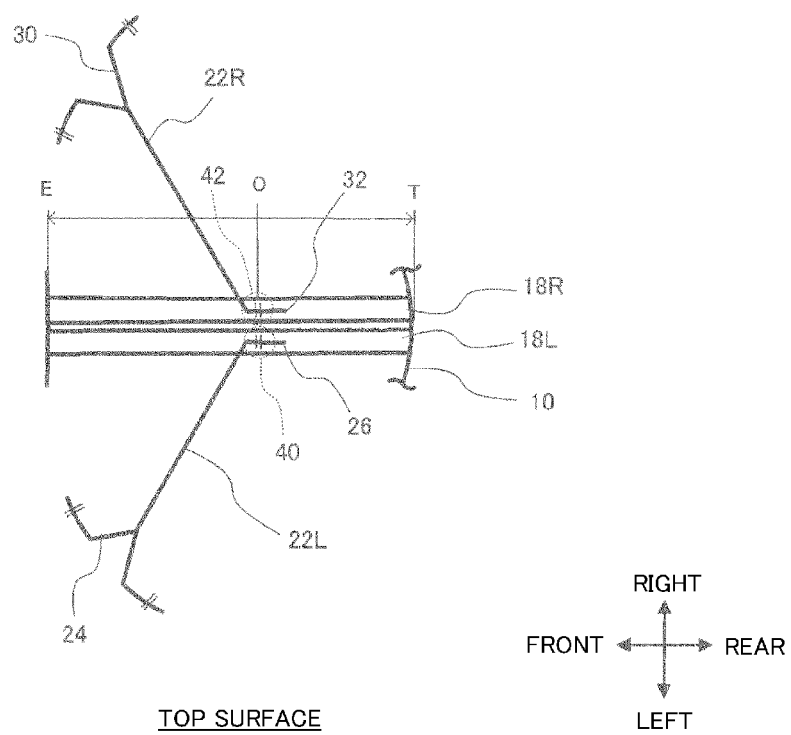
FIG. 6 is a top view showing positions where vent hole opening/closing tethers are coupled to inner tethers in the airbag device according to the present invention.

FIG. 6 is a top view showing the positions where the vent hole opening/closing tethers are coupled to the inner tethers in the airbag device according to the present invention. In the present invention, positions 40 and 42 where the opening/closing tethers 22L and 22R are coupled to the inner tethers 18L and 18R are important. Note that, because of lateral symmetry, a left half will be described by way of example. When the front end position (closer to the steering wheel) of the inner tether 18L is E and the rear end position (closer to the occupant) thereof is T, a coupling position O (40) is set at the middle therebetween, but the coupling position O is preferably set appropriately in accordance with a required property.

When the coupling point O is set at a position closer to the point E or the point T, a slight time lag is produced disadvantageously before the inner tether 18L begins to be warped. By contrast, when the coupling point is set in the vicinity of the longitudinal center of the inner tether 18L thereof, the inner tether 18L is promptly warped or bent starting at the coupling portion 40 resulting from sewing. As a result, the vent hole 20 is promptly opened via the opening/closing tether 22L. Originally, of the oblong inner tether 18L under tension, the portion in the vicinity of the center thereof is likely to be bent first under an input force along the longitudinal direction thereof. Another conceivable cause of the prompt warping of bending of the inner tether 18L is that the portion coupled to the opening/closing tether 22L is likely to serve as the starting point of the deformation (warping or bending).

Figure 7:
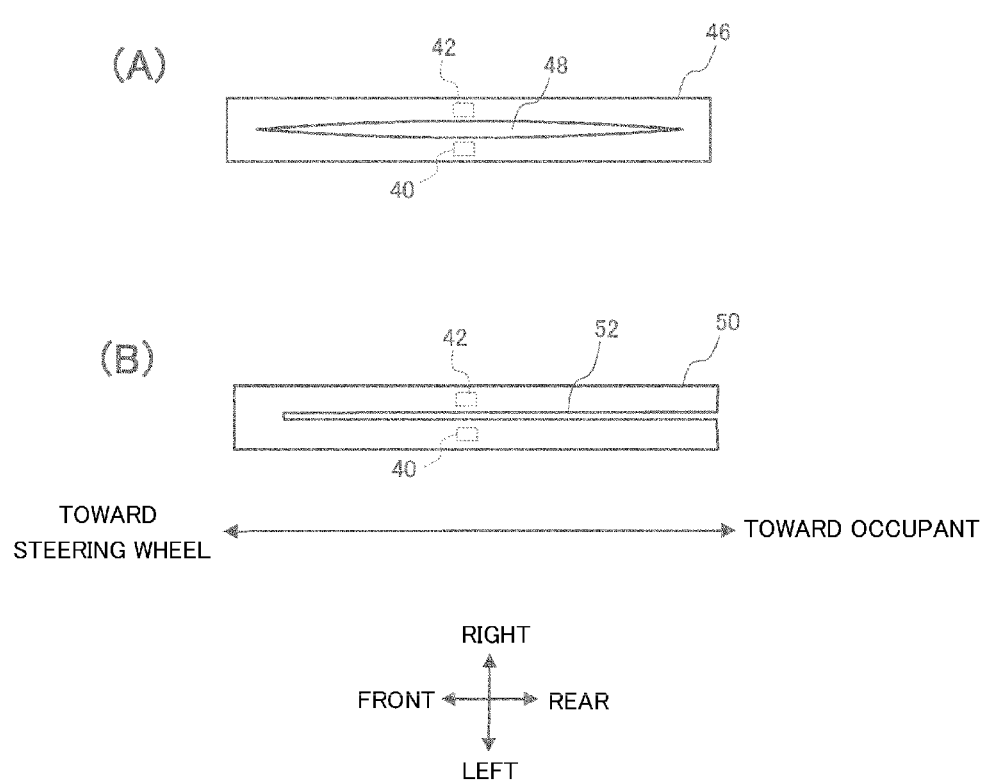
FIGS. 7(A) and 7(B) are plan views showing other examples of a structure of the inner tether used in in the airbag device according to the present invention.

FIGS. 7(A) and 7(B) are plan views showing other examples of a structure of the inner tether used in the airbag device according to the present invention. In the example shown in FIG. 7(A), a slit 48 is formed in the center of the inner tether 46 so as to halve the inner tether 46 along the longitudinal direction thereof. In the example shown in FIG. 6, the inner tether is completely halved but, in this example, the front and rear end portions of the inner tether 46 are in an undivided state.

On the other hand, in the example shown in FIG. 7(B), a slit 52 is formed in the center of an inner tether 50 so as to halve the inner tether 50 along the longitudinal direction thereof, but the front end portion thereof is in an undivided state. By adopting these other two examples, an advantage such as a simpler manufacturing process can be expected.

FIGS. 8(A), 8(B), and 8(C) are views showing still other example of the structure of the inner tethers used in the airbag device according to the present invention, which schematically show states viewed from an occupant in see-through relation and in which a back side and a front side in a direction perpendicular to the paper surface correspond to a "vehicle front" and a "vehicle rear", respectively. The example shown in FIG. 8(A) corresponds to the structure already described using FIGS. 1, 2, 5, and 6. The first and second inner tethers 18L and 18R are disposed in parallel in a lateral/horizontal direction at a position compared to twelve o'clock on a clock. The third inner tether 19 is disposed at a position corresponding to six o'clock to extend in parallel with the first and second inner tethers 18L and 18R in a vertical direction. The third inner tether 19 is formed to have a width about double the width of each of the first and second inner tethers 18L and 18R. The first, second, and third inner tethers 18L, 18R, and 19 may also be integrally coupled together at an end surface 55 of the occupant 100.

In the example shown in FIG. 8(B), first and second inner tethers 56L and 56R are disposed at the same positions as in FIG. 8(A). A third inner tether 53 and a fourth inner tether 54 are disposed at respective positions corresponding to four o'clock and eight o'clock. In the same manner as in the example in FIG. 8(A), the first to fourth inner tethers 56L, 56R, 53, and 54 may also be integrally coupled (formed) together at an end surface 57 closer to the occupant 100.

In the example shown in FIG. 8(C), first and second inner tethers 60L and 60R are disposed at respective positions corresponding to ten o'clock and two o'clock on a clock. A third inner tether 58 is disposed at a position corresponding to six o'clock. In the same manner as in the other examples, the first to third inner tethers 60L, 60R, and 58 may also be integrally coupled (formed) together at an end surface 59 closer to the occupant 100.

As described above, by providing the third and fourth inner tethers, even when the occupant 100 moves to a position displaced from the first and second inner tethers, the deformation (warping or bending) of the third and/or fourth inner tether is transmitted to the first and second inner tethers to allow the opening/closing tethers 22L and 22R to move toward the vent holes 22 and 28 and thus allow the vent holes 20 and 28 to be opened/closed.

In any of the examples, the first and second inner tethers coupled to the opening/closing tethers 22L and 22R are disposed above the vertical center position of the airbag 10 in a deployed state. The first and second opening/closing tethers 22L and 22R are structured to extend obliquely upward at predetermined angles from the first and second inner tethers. By inclining each of the directions in which the opening/closing tethers 22L and 22R extend at the predetermined angle θ, it is possible to finely adjust timings for opening the vent holes 20 and 28. In addition, by increasing the distance between the first and second vent holes 20 and 28, when the occupant 100 moves offset into the airbag 10, at least one of the first and second vent holes 20 and 28 can be opened.

While the embodiment of the present invention has been described heretofore, the present invention is not limited to the embodiment and can be modified within the scope of the technical idea set forth in the appended claims.

While the above description constitutes the preferred embodiment of the present invention, it will be appreciated that the invention is susceptible to modification, variation and change without departing from the proper scope and fair meaning of the accompanying claims.

The invention claimed is:

1. An airbag device for providing impact protection for an occupant of a vehicle, comprising:
    an airbag that is inflated and deployed in front of the occupant to be protected; and
    an inflator that generates a gas which inflates the airbag, wherein
    the airbag includes:
    an inner tether having first and second inner tethers formed by a slit in a center of the inner tether along a longitudinal direction of the inner tether, the first and second inner tethers each having a front panel portion coupled to a stationary portion around the inflator and a rear panel portion coupled to an occupant side of the airbag to control a shape into which the airbag is deployed;
    first and second vent holes formed on left and right sides of the airbag when viewed from the occupant;
    first and second members capable of opening and closing the first and second vent holes;
    a first opening/closing tether having a first end portion coupled to the first member and a second end portion coupled to the first inner tether between the front panel portion and the rear panel portion of the first inner tether; and
    a second opening/closing tether having a first end portion coupled to the second opening/closing member and a second end portion coupled to the second inner tether between the front panel portion and the rear panel portion of the second inner tether,
    the airbag being configured such that, when the airbag is in a fully deployed state, under tension of the first and second opening/closing tethers, the first and second vent holes are closed by the first and second members and, when the occupant contacts the airbag, at least one of the first and second inner tethers is deformed to move at least one of the first and second opening/closing tethers toward a corresponding one of the first and second vent holes and causes at least one of the first and second members to open the corresponding vent hole.

2. The airbag device according to claim 1 wherein respective positions where the first and second opening/closing tethers and the first and second inner tethers are coupled together are in the vicinities of longitudinal centers of the first and second inner tethers.

3. The airbag device according to claim 1 further comprising, the first and second inner tethers and the first and second vent holes are located above a vertical center position of the airbag in the fully deployed state.

4. The airbag device according to claim 3 further comprising,
    the first and second vent holes are located forward of a center of the airbag in the fully deployed state in a vehicle traveling direction, and
    the first and second opening/closing tethers extend at angles smaller than 90 degrees relative to the first and second inner tethers in each of a horizontal plane and a perpendicular plane.

5. The airbag device according to claim 1 further comprising, the airbag further includes a third inner tether.

6. The airbag device according to claim 5 further comprising, the third inner tether having a front panel portion coupled to the stationary portion around the inflator and a rear panel portion coupled to the occupant side of the airbag.

7. The airbag device according to claim 6 further comprising, the third inner tether is disposed at a position corresponding to 6 o'clock and extends parallel with the first and the second inner tethers in a vertical direction.

8. The airbag device according to claim 7 further comprising, the first and the second inner tethers are disposed at positions corresponding to 10 o'clock and 2 o'clock.

9. The airbag device according to claim 6 further comprising, the third inner tether is formed to have a width about double the width of each of the first and the second inner tethers.

10. The airbag device according to claim 6 further comprising, a fourth inner tether having a front panel portion coupled to the stationary portion around the inflator and a rear panel portion coupled to the occupant side of the airbag.

11. The airbag device according to claim 10 further comprising, wherein the third inner tether and the fourth inner tether are disposed at respective positions corresponding to 4 o'clock and 8 o'clock.

12. The airbag device according to claim 6 further comprising, the first and the second inner tethers are disposed at respective positions corresponding to 10 o'clock and 2 o'clock and the third inner tether is disposed at a position corresponding to 6 o'clock.

13. The airbag device according to claim 1 further comprising, the airbag device is a driver seat airbag device contained in a steering wheel.

14. The airbag device according to claim 1 further comprising, the first and second members are formed of a patch plug including a cloth edge connected with the respective first or second opening/closing tethers with the cloth edge covering the respective vent hole when the respective opening/closing tether is under tension and the cloth edge moving away from covering the respective vent hole when the respective opening/closing tether is slack.

15. The airbag device according to claim 1 further comprising, the first and second members cause the respective first and second vent holes to open to allow venting of the gas from the airbag when there is slack in the respective first and second inner tether and the first and second members.

16. An airbag device for providing impact protection for an occupant of a vehicle, comprising:
an airbag that is inflated and deployed in front of the occupant to be protected; and
an inflator that generates a gas which inflates the airbag, wherein
the airbag includes:
first and second inner tethers each having a front panel portion coupled to a stationary portion around the inflator and a rear panel portion coupled to an occupant side of the airbag to control a shape into which the airbag is deployed;
first and second vent holes formed on left and right sides of the airbag when viewed from the occupant;
first and second members capable of opening and closing the first and second vent holes;
a first opening/closing tether having a first end portion coupled to the first member and a second end portion coupled to the first inner tether between the front panel portion and the rear panel portion of the first inner tether; and
a second opening/closing tether having a first end portion coupled to the second opening/closing member and a second end portion coupled to the second inner tether between the front panel portion and the rear panel portion of the second inner tether,
the airbag being configured such that, when the airbag is in a fully deployed state, under tension of the first and second opening/closing tethers, the first and second vent holes are closed by the first and second members and, when the occupant contacts the airbag, at least one of the first and second inner tethers is deformed to move at least one of the first and second opening/closing tethers toward a corresponding one of the first and second vent holes and causes at least one of the first and second members to open the corresponding vent hole, and
wherein the airbag further includes a third inner tether.

17. The airbag device according to claim 16 further comprising, the third inner tether having a front panel portion coupled to the stationary portion around the inflator and a rear panel portion coupled to the occupant side of the airbag.

18. The airbag device according to claim 17 further comprising, a fourth inner tether having a front panel portion coupled to the stationary portion around the inflator and a rear panel portion coupled to the occupant side of the airbag.

\* \* \* \* \*